UNITED STATES PATENT OFFICE.

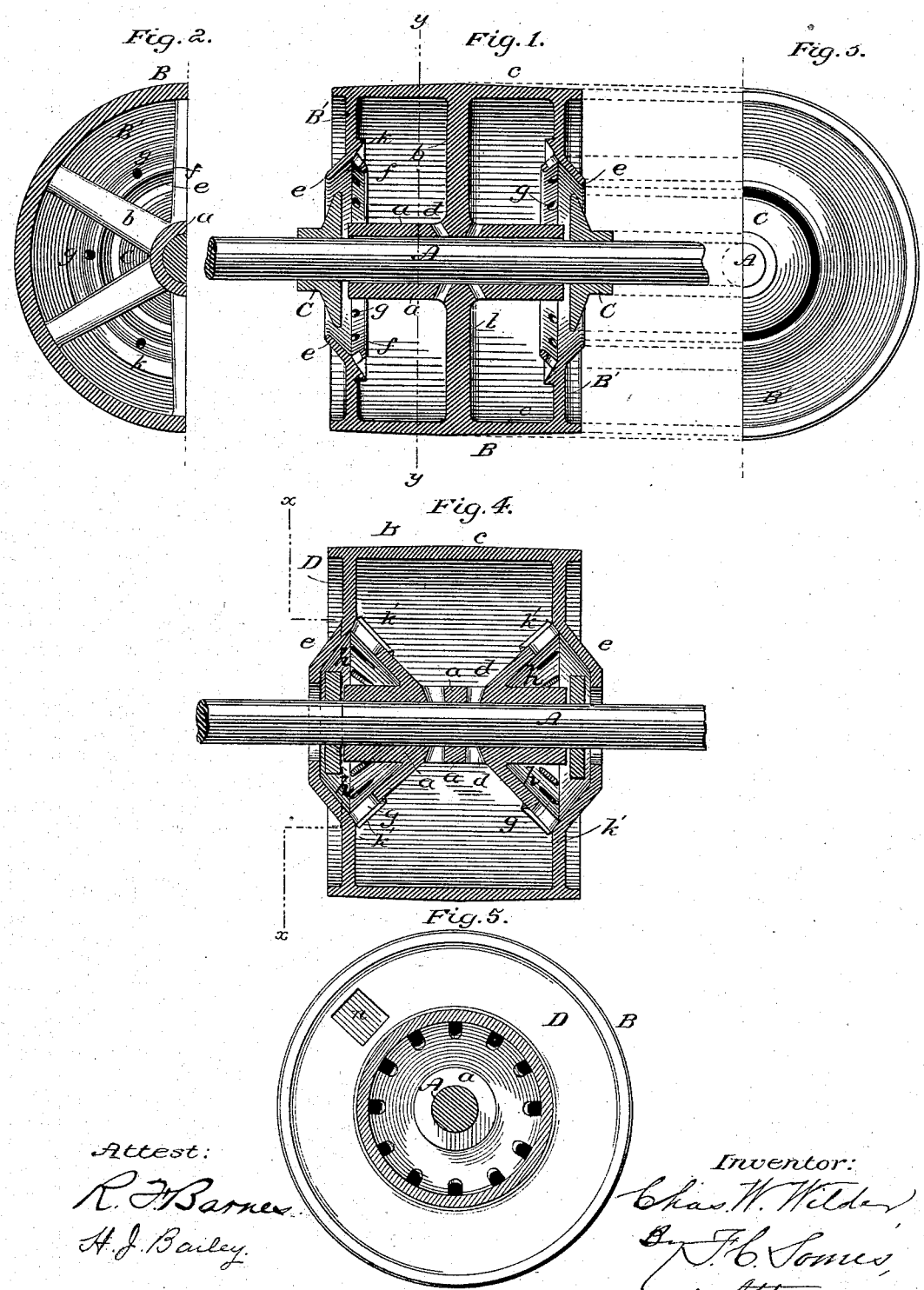

CHARLES W. WILDER, OF FITCHBURG, MASSACHUSETTS.

SELF-LUBRICATING LOOSE PULLEY.

SPECIFICATION forming part of Letters Patent No. 251,666, dated December 27, 1881.

Application filed March 31, 1881. (No model.)

*To all whom it may concern:*

Be it known that I, CHARLES W. WILDER, a citizen of the United States, residing at Fitchburg, in the county of Worcester and State of Massachusetts, have invented certain new and useful Improvements in Self-Lubricating Loose Pulleys; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
This invention relates to means for lubricating the bearings of loose pulleys and other wheels rotating on shafts or axles.

Loose pulleys have heretofore been constructed with self-oiling devices and with means for returning the oil to the reservoir, to be used over and over again. With such pulleys it has been found difficult to secure at all times a sufficient supply of oil for thorough lubrication without a large percentage of waste.
The object of this invention is to provide improved means for the employment, without waste, of a large quantity of oil for lubrication, and also for washing and cleansing the bearings.
Figure 1 of the drawings represents a longitudinal section of a loose pulley constructed according to this invention. Fig. 2 is a transverse section, showing one-half of said pulley. Fig. 3 is an end view of half of said pulley.
Fig. 4 is a longitudinal section of a modification. Fig. 5 is an end view of said modification, partly in section, as indicated by line *x x* of Fig. 4.

The shaft or axle A is of any ordinary construction. The pulley B turns loosely on the shaft, and is held in place thereon by means of collars C, fixed thereto. Said pulley, as regards the hub *a*, arms *b*, and rim *c*, is of the usual construction. The hub is provided with holes *d*, located preferably at or near the foot of each arm, through which holes the oil for lubricating the bearing passes. The ends of the pulley are partially closed by means of flanges or heads B', whereby an annular chamber is formed within the pulley, which serves as a reservoir for containing the oil. These flanges or heads are cast with or attached to the rim, and have circular openings in the center, through which the shaft passes. The diameter of these openings is about one-third, more or less, the diameter of the pulley. The said flanges are provided at their inner edges with outwardly-projecting lips *e*, which extend beyond the line of the collars, and also with inwardly-projecting lips *f*. These lips cover the joints between the collars and the pulley-hub, and form an annular groove, which serves to catch the oil that works out at the ends of the bearing and drips from the collars, conducting it back through holes *g* of the inner lip to the interior of the pulley, to be used again.

The operation is as follows: A large supply of oil is poured into the pulley through one of the end openings. When the pulley is at rest the oil remains in the lower part thereof. When the pulley is in motion most of the oil is distributed around the inner face of the rim. When the belt is shifted to the adjoining fast pulley, or for other cause, the loose pulley stops, the body of the oil gravitates to the lower part of said loose pulley. The upper part of said loose pulley is, however, at this time wet with oil, which trickles down the arms to or drops directly upon the hub, and thence passes through the holes in the latter to the bearing. In whatever position the pulley stops one or more arms will be above the center, and so inclined as to readily convey the oil to the hub. The tendency of the oil on the bearing is to work out at the ends of the hub, when it will come in contact with the collars C, and, running down their faces, will drop off and be caught between the projecting lips of the pulley-heads. Thence, impelled by the action of centrifugal force, it will pass through the holes in the inner lip back into the chamber, to be used over and over again. On the stoppage of the pulley a portion of the oil from the upper half will run down the inner side of the heads, and to prevent it from passing out through the entrance-holes of the inner lip an annular rib, *k*, is formed on the inside of each head just beyond said lip, which rib serves to conduct said oil around the opening of the head to the lower part of the pulley. When the pulley is run at a slow rate of speed the oil will continually drop upon the hub in large quantities from the upper portion of the moving rim, and an ample quantity will be cast upon the hub and find its way into the holes when the pulley is running at an ordinary or high rate of speed.

Figs. 4 and 5 show a modification of the invention. In this case the central arms are dispensed with and webs D are provided, which serve the double purpose of the flanges B' and the arms b of the construction before described. These webs may be described as formed by extending the inner lips of the former construction to and uniting them with the hub, thus closing the large central openings of said former construction, and forming heads which are completely closed with the exception of the oil-return holes g in the inner portions of said webs. The outer lips are also more extended than in the former construction, and annular chambers h are formed by said extended lips, into which fibrous packing may be placed, if desired, to aid in returning the oil to the annular chamber. Collars C, of leather, metal, wood, or other suitable material, are fixed to the shaft at the ends of the pulley, as in the other case. Ribs k' are also provided in this case around each hole on the inside of the heads.

In case rubber or leather collars are used in connection with pulley shown in Figs. 4 and 5, they may be sprung through the end openings before the shaft is put through. If metal or wood collars are used, the outer lip of the pulley will be cast in a separate piece and attached by screws or otherwise to the head. When a pulley like that shown in Fig. 1 is used the hub of the adjoining tight pulley would answer instead of one of the collars, and if near a bearing or the shaft one end of the box or bearing would answer for the other collar. One end of the pulley is provided with a glass window, n, to enable the operative to ascertain the amount of oil in the pulley.

In the use of pulleys constructed according to this invention more oil will reach the shaft than is needed to oil it well, the surplus being returned to be used again, thus avoiding waste. The use of a surplus of oil is a benefit in two ways. It secures a sufficient supply to insure perfect oiling of the shaft, and it washes out all the worn matter that comes from the wear of the shaft and pulley, leaving the running parts clean and well oiled.

What is claimed as the invention is—

1. A pulley adapted to contain oil, the ends of which are partially closed by heads having central openings, said heads being provided at said openings with outwardly and inwardly projecting lips and beyond said lips with interior annular ribs, substantially as described.

2. A hollow loose pulley forming an oil-reservoir from which oil is supplied to the bearing, in combination with the outwardly-flaring and perforated inwardly-flaring lips and collars on the shaft, substantially as described.

3. A pulley adapted to contain oil, the ends of which are partly closed, in combination with the outwardly-flaring lips and the annular ribs on the inside of the heads, substantially as described.

4. A pulley adapted to contain oil, having combined with it collars on the shaft arranged in the vertical planes of the annular grooves formed by the inwardly and outwardly flaring lips, substantially as described.

5. A pulley having an oil-reservoir occupying nearly the entire interior thereof, provided at its open ends with lips which are perforated and extended inwardly, in combination with collars fixed on the shaft, substantially as described.

6. A hollow self-lubricating pulley having heads which are constructed with central openings surrounded by lips e f, the latter being perforated, in combination with the annular ribs k and a perforated hub, the whole being formed substantially as described.

7. The annular oil-conducting ribs formed on the inner sides of the pulley-heads surrounding the central openings through them, substantially as described.

CHARLES W. WILDER.

Witnesses:
CHAS. S. HAYDEN,
D. B. WHITTIER.